(12) United States Patent
Hait

(10) Patent No.: US 6,256,124 B1
(45) Date of Patent: Jul. 3, 2001

(54) COMBINATION PHOTONIC TIME AND WAVELENGTH DIVISION MULTIPLEXER

(75) Inventor: John N. Hait, San Diego, CA (US)

(73) Assignee: All Optical Networks, Inc., San Diego, CA (US)

( * ) Notice: Subject to any disclaimer, the term of this patent is extended or adjusted under 35 U.S.C. 154(b) by 0 days.

(21) Appl. No.: 09/075,046

(22) Filed: May 8, 1998

(51) Int. Cl.[7] ..................................................... H04J 14/00
(52) U.S. Cl. ........................... 359/123; 359/135; 359/140; 359/158
(58) Field of Search ........................... 359/123, 124, 359/135, 115, 140, 158; 370/297, 280, 294, 503; 375/286

(56) References Cited

U.S. PATENT DOCUMENTS

| | | | |
|---|---|---|---|
| 2,519,083 | * 8/1950 | Sutter et al. | 370/212 |
| 3,506,834 | * 4/1970 | Buchsbaum et al. | 359/138 |
| 4,182,935 | * 1/1980 | Chown | 359/123 |
| 4,467,468 | * 8/1984 | Miller | 359/123 |

* cited by examiner

*Primary Examiner*—Jason Chan
(74) *Attorney, Agent, or Firm*—Leonard D. Schappert; A. John Pate; Gary D. E. Pierce

(57) ABSTRACT

A delayed-pulse photonic time division multiplexer which provides a parallel digital data to photonic serial conversion is disclosed. Modifications which provide wavelength division multiplexing are also included. A series of input pulses of photonic energy are directed into an output as sync pulses. The input pulses are also directed into a group of n optical modulators to read parallel digital data that has been loaded into the modulators. Modulator outputs are delayed by digit-transmission-time intervals and directed into the output as serial data between the sync pulses. Input pulses are also used to trigger the loading of the next data set into the modulators during the time that the previous data set is being transmitted in serial. The invention can send serial data at the maximum speed of optical components while using data from slower electronic components. The invention can also use all-photonic components and signals, including frequency-multiplexed signals, with its time division multiplexing functions for each frequency channel. Outputs can use a variety of modulation forms, including multistate semaphores.

11 Claims, 3 Drawing Sheets

COMBINATION PHOTONIC TIME AND WAVELENGTH DIVISION MULTIPLEXER

BACKGROUND OF THE INVENTION

1. Technical Field

The present invention relates to time and wavelength division multiplexing of binary and non-binary digital information for photonic transmission and information storage systems.

2. Background Art

U.S. Pat. No. 5,623,366, Hait, describes a photonic method of parallel to serial conversion in col. 9 line 54 to col. 10 line 12 and col. 54 lines 1–13 and FIGS. 24 and 24A. What Hait does not teach is the means and method of providing the proper pulse timing needed in his FIG. 24A when the parallel information input provides pulses that arrive in parallel substantially at the same time.

Hait also does not teach how to use a single pulsed laser system (or other single pulsed photonic input system) to provide all the required sequential output pulses, including synchronization pulses, needed to provide a complete serial transmission system.

Nor does Hait teach how to interface electronic with photonic components in order to provide serial photonic transmission capable of operating at a rate faster than the rate at which electronic components provide parallel digital data input.

In the early days of electronic integrated circuit technology, attempts were made at "pulse racing," that is, timing the delay of signals traveling through a computer chip so that a number of signals arrive at a specific location having a specific timing relationship determined by the various delays applied to each signal. It was found that the many electronic variables involved, such as capacitance and inductance, made pulse racing impractical and unreliable as chip frequencies increased.

Electromagnetic energy, on the other hand, does not suffer from the level of capacitance and inductance complexities found in computer chips. The amount of delay that occurs along a photonic delay path can be determined quite accurately even into the subpicosecond range.

The present invention takes advantage of these characteristics of electromagnetic energy and the materials used with it to provide a complete time division multiplexing system that Hait does not.

SUMMARY OF THE INVENTION

The present invention, a delayed pulse photonic time division multiplexer, is a means and method of providing parallel digital data to serial data conversion having a photonic serial digital output that can be used with both binary and non-binary transmissions. A series of pulses of photonic energy are input to provide an electromagnetic energy and pulse timing source, which is divided into portions. A portion of the energy of these pulses is directed into the output to provide sync (synchronization) pulses which a photonic receiver uses to time the recovery of serial information and convert it into parallel information. "In serial" as used herein refers to data in serial format; i.e., in series.

A portion of the energy of the input pulses is also directed into n optical modulators, the integer "n" being the number of data digits that are to be transmitted in serial within a single data set between sync pulses. For example, if n=8 and the digits are binary, then a byte of serial information would be sent. If n=32, then a 32-bit word is sent. The actual number of digits sent is a matter of engineering choice. The engineer may take into account the need for signal amplification within the receiver and/or the transmitter. He may also need to take into account the accumulation of delay error that can occur using certain types of delay means.

The n optical modulators are first set to their data modulation states, then allowed to complete their setup times, and finally held in those states while each one has a photonic pulse directed to it. In the case of binary amplitude modulation, the pulses either are transmitted through each modulator or are inhibited. However, the present invention is not limited to binary transmission only, but can utilize multistate semaphore digits that use more than two modulation states during each digit time. Thus, the word "digital" in this disclosure can refer to either a binary semaphore or one having more than two modulation states.

Associated with the group of n optical modulators is a group of n serial timing delay means. Each modulator has one of these delay means in series with it so that the photonic pulse reads the condition of the modulator and is delayed sufficiently and directed into the common output so that the resulting modulated digit arrives at the output at its assigned digit time. All the n modulated and delayed pulses therefore arrive at the output in serial following a sync pulse and prior to the next sync pulse. This produces a complete data set having n digit positions filled with the n delayed digital pulses.

Each serial timing delay means may be placed either before or after its modulator; however, the timing provided by all the delay means throughout the present invention must be adjusted so as to time the serial digits properly.

Optical modulators have a setup time; that is, it takes a certain amount of time for the modulators to stabilize in response to their controlling electronic inputs. After this setup time has elapsed, the modulators remain stable during the next photonic pulse, which reads the information loaded into the modulators by the electronic inputs.

Parallel information is provided through n digital information inputs. Each modulator has associated with it one of n modulator loading means which loads digital information from one of the n digital information inputs into its modulator. When triggered, the n modulator loading means load the n optical modulators with modulation states from the n digital information inputs. To initiate modulator loading and begin the setup time for the next data set, the input pulses are directed into the group of n modulator loading means.

The present invention is very versatile in that it can be engineered to match a variety of optical modulators, parallel inputs, optical transmission lines, and demultiplexers. One reason the present invention is superior is that modulators that require a long setup time can be loaded for the next data set while the previous data set is being transmitted, so that time is used efficiently. As a result, the present invention can be engineered to accommodate slow modulators by increasing the number of digit times and the number of parallel information inputs (that is, by increasing n) without wasting valuable transmission time and effective bandwidth.

When photonic parallel inputs are provided along with photonic modulators and loading means, the setup times may be quite short. However, the present invention also has the advantage of being able to interface very slow electronics with the high-speed photonics. In that case, the modulator loading means can be electronic circuits that control optoelectronic modulators triggered by the photonic pulses using a photo diode. Thus, the complete means for triggering and loading the modulators may involve the use of prior art optoelectronic, electronic and/or photonic circuitry.

The loading circuits load information from the digital information inputs into the modulators and hold that information there until the following trigger pulse has occurred. The following trigger pulse occurs after the setup time and the photonic read pulse for that data set.

The pulses which trigger modulator loading may require a delay means to prevent a state change within the modulators during the time that photonic pulses are traveling through the modulators. This depends upon the engineer's choice of circuitry. This loading delay means can be placed between the input pulse source and the modulators. Individual loading delay means can be inserted as needed to produce proper output timing before any or all of the n optical modulators.

A sync timing delay means may also be inserted between the input pulse source and the output so that sync pulses will be properly timed in the output. All of these various delay means can be engineered or made adjustable in order to accommodate a great variety of hardware components and transmission protocols.

It should be noted that, in the arrangement having the n optical modulators placed before the n serial timing delay means, the first transmitted data set is not yet set up and loaded into the modulators from the parallel digital information input until the first pulse has read the n optical modulators and/or the sync pulse is not delayed by a full data set time. The result is that the first data set following the first sync pulse may be a null data set or may contain spurious or preset information, depending on the circuitry which controls the modulators. Some types of receivers require a specific data set for initialization or calibration. This is one means of providing the beginning data set.

The first photonic input pulse triggers the loading of the first data set from the parallel digital information input, which will be transmitted following the second photonic sync pulse. Each modulator is loaded while the previous data set is being transmitted. Following this initialization, sync pulses are interspersed with data set pulses.

Wavelength division multiplexing (which may also be referred to as frequency multiplexing) can be accomplished by the present invention in two different ways. If the parallel input information is already wavelength division multiplexed, the present invention can be constructed using frequency multiplexed logic components and by providing frequency matched input pulses. Such components are described in U.S. Pat. No. 5,617,249.

Wavelength division multiplexing can also be accomplished through the combination of multiple multiplexers of the present invention routed into a common output. If the pulses of the separate wavelengths used are in sync, only one sync pulse need be sent on one of the wavelengths. However, if they are not in sync, or if the demultiplexer to be used is not capable of providing synchronization among multiple photonic channels, a sync pulse can be provided for each wavelength channel using the same method as that by which the sync pulses are provided in a single wavelength embodiment. Since each data set-sync pulse data frame can be transmitted asynchronously, the problems associated with wavelength dispersion among the wavelength channels can be minimized.

Because the minimum number for n is two, the present invention can be described in terms of first and second components. The present invention is a method of parallel digital data to photonic serial conversion using delayed-pulse timing comprising the following steps:

providing a first photonic pulse input having a first wavelength, at least first and second digital inputs which constitute a first parallel digital input, a multiplexer output, at least first and second photonic modulators, and at least first and second modulator loading means for loading first modulation states into said first and second photonic modulators using information from said first parallel digital input;

routing said first digital input to said first modulator loading means and said second digital input to said second modulator loading means, and providing a routing system
which routes said first modulation states from said first modulator loading means to said first modulator and from said second modulator loading means to said second modulator,
which routes input pulses from said first photonic pulse input to said first and second modulator loading means to initiate modulator loading, to said multiplexer output to provide sync pulses, and to said first and second photonic modulators to read said first modulation states loaded into said first and second photonic modulators to provide first photonic digital pulses of said first wavelength, and
which routes said first photonic digital pulses to said multiplexer output,
said routing system including delay means as necessary to time the arrival of said first photonic digital output pulses at said multiplexer output in serial between said sync pulses.

The capability of the present invention to load information from one data set while simultaneously transmitting another data set enables the present invention to transmit sequential data frames without introducing undesirable delays between frames. This is accomplished because the delay means are arranged to provide said photonic digital pulses at said multiplexer output from a first data set input to said first parallel data input while said photonic modulators are being loaded with a second data set from said first parallel digital input.

A combined wavelength division and time division multiplexing method of the present invention can be produced by providing multiple multiplexers as described above having different photonic wavelength inputs, and combining the time division multiplexed outputs from all wavelengths into a common output. This is done by:

providing a second photonic pulse input having a second wavelength, at least third and fourth digital inputs which constitute a second parallel digital input, at least third and fourth photonic modulators, and at least third and fourth modulator loading means for loading second modulation states into said third and fourth photonic modulators using information from said second parallel digital input;

routing said third digital input to said third modulator loading means and said fourth digital input to said fourth modulator loading means, and providing a routing system
which routes said second modulation states from said third modulator loading means to said third modulator and from said fourth modulator loading means to said fourth modulator,
which routes input pulses from said second photonic pulse input to said third and fourth modulator loading means to initiate modulator loading, and to said third and fourth photonic modulators to read said second modulation states loaded into said third and fourth photonic modulators to provide second photonic digital pulses at said second wavelength, and which routes said second photonic digital pulses to said multiplexer output, said routing system including delay means as necessary to time the arrival of said second photonic digital output pulses at said multiplexer output in serial between said sync pulses, thereby providing a method of wave division multiplexed time division multiplexing.

Optical modulators can be loaded and controlled by a variety of different means. The most common means is electronic. However, there are also mechanical, electromechanical, acoustical, and various other methods. All of these means have one thing in common: their top switching speeds are much slower than the short pulse times that can be achieved with electromagnetic energy, including laser light. Even these slow modulator setup times can be accommodated.

For example, if the single digit times (as determined by the length of the input pulses) are one femtosecond long and an optoelectronic setup time is one nanosecond, one million serial digits can be placed between sync pulses. Transmission parameters can be engineered to account for the properties of whatever components are available. One of the advantages of the present invention over other devices is that photonic delay means, including free-flight path differences and/or optical fibers, can be precisely manufactured in order to provide the precise timing needed to insure the reliability of a million digits following a single sync pulse. Prior art methods are not sufficiently reliable as to make such a transmission protocol practical.

Another class of optical modulators are photonically controlled. With such photonically controlled modulators, high-speed speed parallel photonic inputs can provide very short setup times. Thus, sync pulse repetition rates, and data transmission rates can be selected to suit the photonic components being used. Such photonic components may include photonic transistors, self-exciting electro-optical devices (SEEDS), and nonlinear optical materials.

The use of photonically controlled optical modulators also allows for the construction of more complex multiplexers having multiple parallel inputs and various organizations of delay times as needed to match the various parallel digital data sources and transmission protocols to be used.

Certain optical modulators, such as photonic transistors of U.S. Pat. No. 5,617,249, can provide frequency multiplexed logic, which can be used to frequency multiplex and time division multiplex information simultaneously using the present invention. Each of the multiplexing frequencies must be provided at the photonic input to provide a series of pulses for each frequency channel. However, with suitable circuitry, sync pulses need only be sent on one of the channels. The result is a combination of wave division and time division multiplexing.

The present invention can be designed to work with amplitude, phase, spacial and polarization modulation techniques as needed for a particular circumstance. Different forms of modulation can be used to make the separation of sync pulses from data pulses easier at the receiver and to provide multiple states for the transmission of semaphore digits having more than two modulation states. The optical modulators, support circuitry and delay means are selected to provide the needed modulation combinations. Sync pulses can even be modulated as multilevel semaphores that can be used for data set routing or other purposes at the receiver.

Thus the terms "digit" and "digital" as used herein include multilevel as well as binary digits.

The serial output can be used for direct photonic transmission through free space, waveguides or optical fibers. The output can also be directed along a delay path such as a free-space path or an optical fiber to provide a method of photonic information storage. The output can also be written onto or into various information storage media including holograms, photographs, CD-ROMS, and other photosensitive materials.

Even though this disclosure uses optical terminology, the present invention can be used with photonic energy anywhere within the electromagnetic spectrum through the selection of appropriate components to match the frequencies being used. Most notable is the microwave region, where the present invention can be used to multiplex information sent via satellite or other microwave links. The recent commercialization of x-ray technology, including x-ray capillaries (like optical fiber for x-rays), can be used to provide multiplexing in the x-ray bands.

The use of spacial modulation is not common. While it is more complex than the more usual methods, the present invention can use this method of transmission. It is particularly useful when serialization is required inside a photonic computer or mass information storage device. Appropriate components must be employed as with the other modulation methods.

An object of the present invention is to provide a means and method of converting parallel digital information input to photonic serial information.

Another object of the present invention is to provide a means and method for high-speed parallel photonic sampling of preset modulation states loaded into slow modulators followed by transmission of the sampled information in serial during the modulator setup time for the following data frame, thus providing a means and method of maximizing photonic throughput by using the shortest transmissible photonic pulses while using slow modulators (even electro-optical ones) having response times longer than the photonic sampling pulses.

Another object of the present invention is to provide a means and method for optimizing data frame repetition rates by matching them to the modulator setup times combined with multilevel semaphores to maximize overall transmission rates for each carrier wavelength and then adding separate carrier wavelengths until a selected transmission medium, be it an optical fiber or a free-space beam, has been saturated to its maximum physical information-carrying capacity.

Another object of the present invention is to provide a means and method for photonically transmitting electronic information using the fastest available electronic and photonic components.

Another object of the present invention is to provide a means and method for transmitting serial information using digital semaphores having more than two modulation states.

Another object of the present invention is to provide a means and method for transmitting serial information using a variety of photonic modulation means and methods.

Another object of the present invention is to provide a means and method for transmitting serial information into an optical fiber for the purpose of retrieving said information at a future time.

Another object of the present invention is to provide a means and method for transmitting serial information to a satellite reflector or transponder, as the present invention can be designed to use photonic energy in the microwave as well as the optical portions of the electromagnetic spectrum.

Another object of the present invention is to provide a means and method for transmitting serial information using the various parts of the electromagnetic spectrum including optical (both visible and invisible,) microwave, and radio frequencies.

Another object of the present invention is to provide a means and method for transmitting simultaneous serial (time division) and wavelength division (frequency multiplexed) information.

The foregoing objects and benefits of the present invention will become clearer through an examination of the drawings, description of the drawings, description of the preferred embodiment, and claims which follow.

DESCRIPTION OF THE PREFERRED EMBODIMENT

Figure 1:
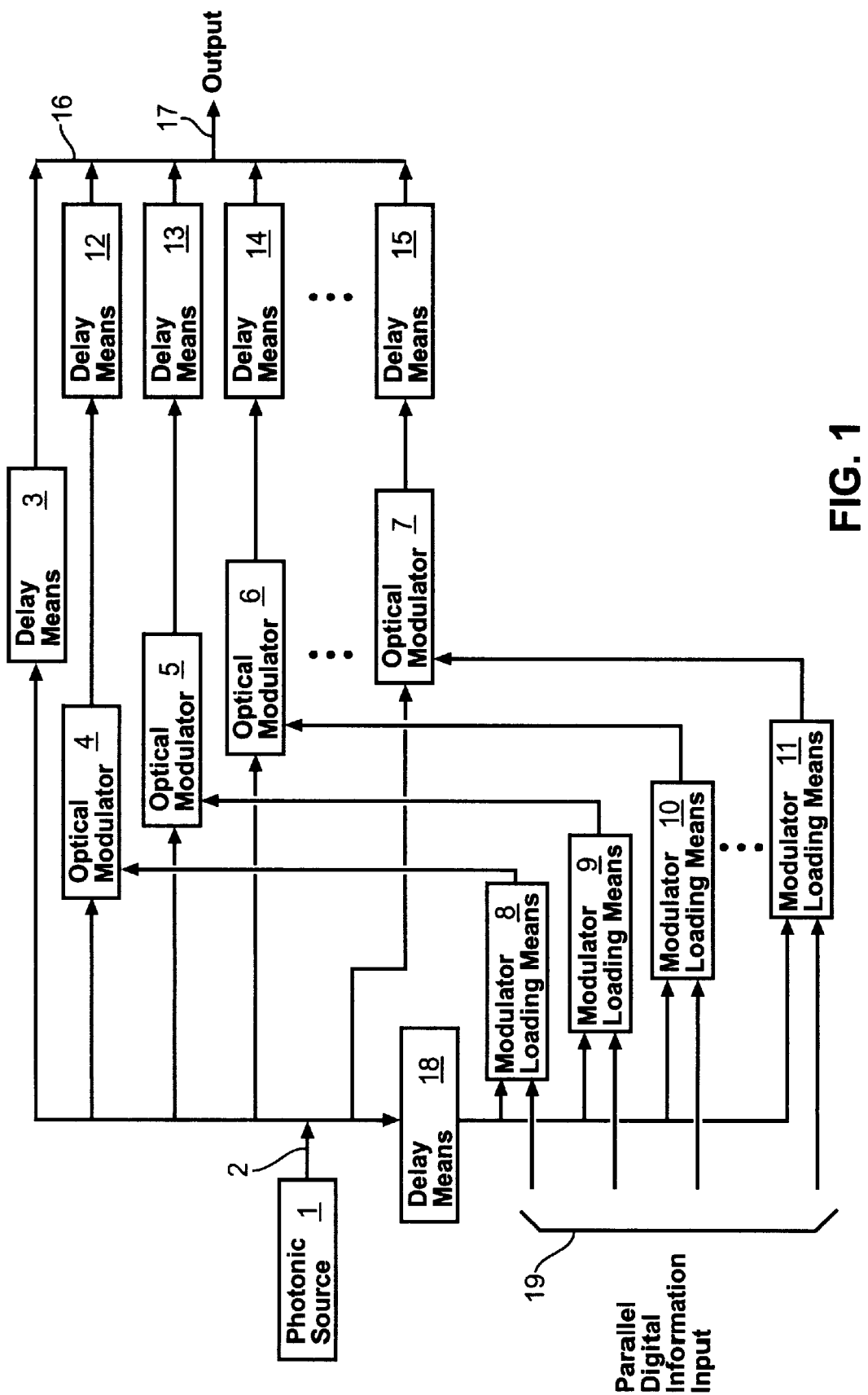
FIG. 1 is a block diagram of a parallel digital data to photonic serial data converter which constitutes the multiplexer of the present invention.

FIG. 1 is a block diagram of a delayed-pulse photonic time division multiplexer which is a parallel digital information to photonic serial information converter of the present invention. Three dots between components indicate identical components for information flow lines up through n−1.

Figure 2:
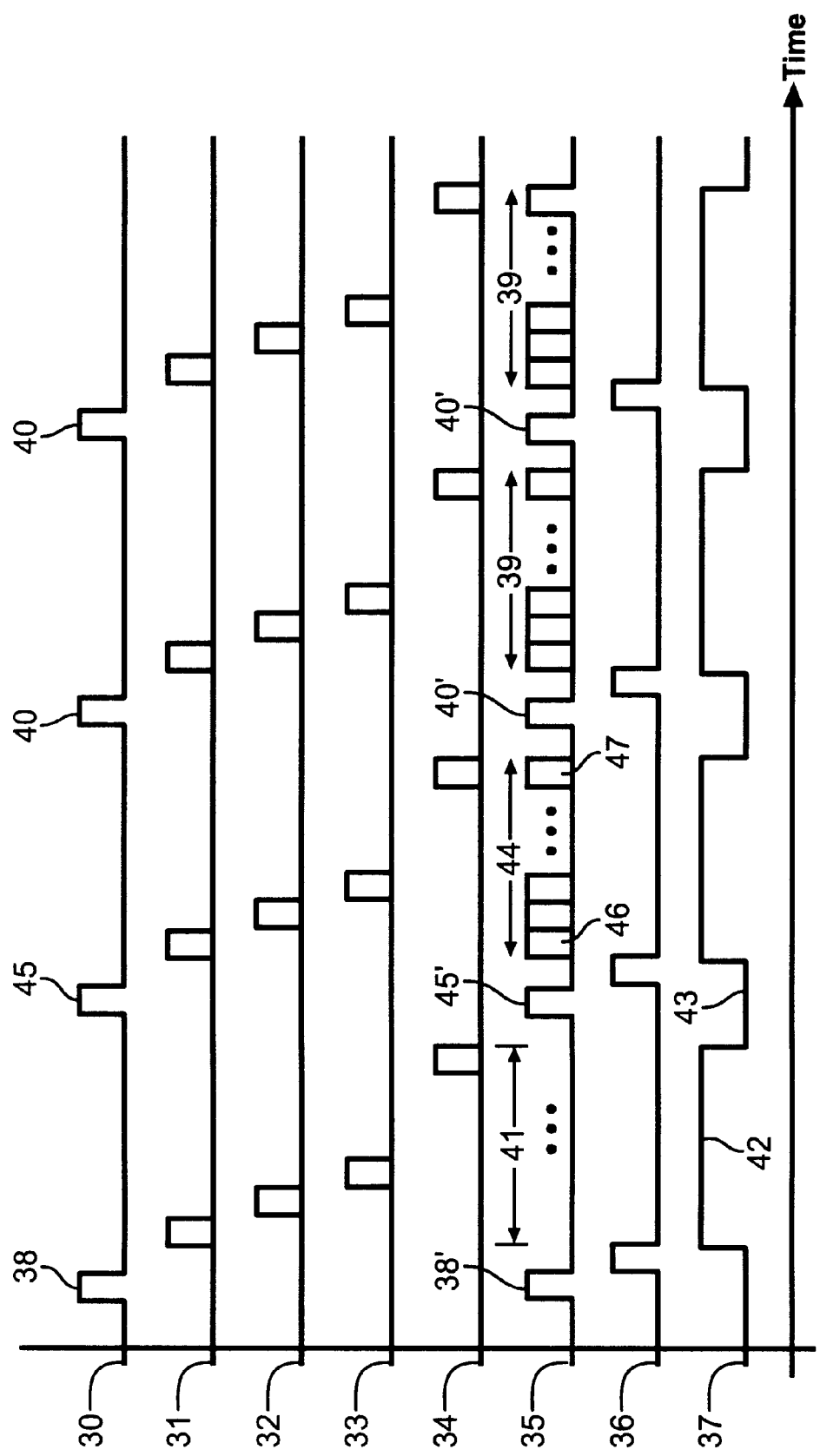
FIG. 2 is a pulse timing diagram indicating the relationship between photonic pulses and modulator setup times.

FIG. 2 is a pulse timing diagram that shows how delay times can be organized for the various required pulses and how they relate to each other. Three dots within data sets on time line (35) depict identical digit times up through n−1.

The present disclosure is easily understood by examining FIGS. 1 and 2 together. Reference characters 1 through 17 are used in FIG. 1 and reference characters 30 through 47 are in FIG. 2.

A series of photonic pulses (optical, microwave, or RF) are provided by photonic source (1) routed into multiplexer input (2) as shown by time line (30). These input pulses (38), (40), and (45) are directed through sync delay means (3) to provide sync pulses (38'), (45'), and (40') at photonic output (17) as shown in time line (35).

Certain types of time division demultiplexers require specialized sync waveforms, such as shortened pulses, or specialized modulation characteristics. These can be provided by insertion either with sync delay means in line (3) or between photonic source (1) and the other components or both for use in demultiplexing.

Electronic digital information can be input to optical modulators (4)–(7) by parallel digital information input (19).

Input pulses from multiplexed input (2) as shown on time line (30) are also supplied to a group of n optical modulators to sample their previously loaded and held modulation states. Four of the n optical modulators are shown: (4), (5), (6), and the $n^{th}$ optical modulator (7). The output of each optical modulator is directed into its own serial timing delay means. Serial timing delay means depicted are (12), (13), (14) and the $n^{th}$ one (15).

The integer n can be any integer where at least one modulator and at least one serial timing delay means are provided for each digit time in output (17) as shown on time line (35), just as with those modulator and serial delay means combinations depicted. Output digit time examples include the first digit pulse (46) and the $n^{th}$ digit pulse (47) in example data set (44).

The output from the group of n optical modulators and the group of n serial delay means is n delayed digital pulses that are timed to arrive at output (17) in serial.

The basic transmission sequence for a single data frame is:

1. modulator loading is initiated by a timed photonic pulse from photonic source (1) routed to modulator loading means (8)–(11).
2. optical modulators (4)–(7) are loaded during their setup times by modulator loading means (8)–(11)
3. the loaded modulation states are then held for a period of time to allow photonic sampling of the loaded modulation states.
4. photonic pulses from photonic source (1) are then routed through optical modulators (4)–(7) to sample their modulation states.
5. the modulated photonic pulses are then routed and delayed along with a sync pulse to arrive at output (17) in serial.
6. during step 5 above, step 1 begins again to prepare the modulators for data sampling for the next frame.
7. The transmission sequence can be started anywhere in the sequence; however, the information transmitted during the first frame may depend upon a number of other factors explained below.

Because optical modulators which provide more than two stable modulation states can also be used, non-binary semaphores (digits) can be used in the present invention. When only two states are used, the digit times are the same as "bit times" as commonly used in the electronic serial communications art. Digit times shown in FIG. 2 having both top and bottom lines (as an example, time line (31)) indicate that the actual modulation states depend upon the modulation states of the respective modulators.

While FIG. 2 depicts common amplitude modulation form, the actual form of modulation used may be amplitude, phase, spacial, or polarization, or any combination of these. The present invention provides time division multiplexing by means of pulse delays regardless of the modulation method(s) used for the pulses. Certain modulation combinations may require the use of multiple modulators and/or multiple delay means for each digit time as the engineering of these components requires. Delay means can include free-space distances, materials having an index of refraction greater than one, waveguides, optical fibers, one-shot multivibrators, and other more complex circuitry. One advantage of using delaying materials such as glass, optical fibers, etc., is that these can be machined very precisely to maintain digit times within tolerance while allowing or compensating for temperature and other fluctuations within materials being used. Changes that do occur can be accurately measured, and such compensating information can be sent to the demultiplexer in order to compensate at the receiving end.

Each of the serial timing delay means (12) through (15) provides a different delay time so that the n delayed digital photonic pulses shown on time lines (31) through (34) are combined with the sync pulses at location (16) and arrive at output (17) as shown on time line (35) as data sets (39), (41), and (44) in serial in between sync pulses. As an example, the delay means can be made of optical fibers, the outputs of which are all directed through a lens and into another optical fiber which constitutes output (17).

The time spaces shown on either side of sync pulses, such as sync pulse (45) between data set times (41) and (44), are optional and can be used if needed by a particular demultiplexer.

Each of the n optical modulators has a required setup time which must elapse before the modulating information in the modulators is sufficiently stable to be read by sending a photonic pulse into the modulators. This characteristic, which has often been viewed as a detriment in prior systems, is put to good use in the present invention. The summation of digit times that make up a data set, for instance (39) or (44), can be designed to be at least as long as one of the optical modulator's setup times shown on time line (37). All modulator setup times depicted on time line (37) are substantially the same as, for example, (42).

If the modulators chosen are very slow in comparison with the photonics, more digit times in can be added to each data set by adding more parallel inputs in parallel digital information input (19) along with corresponding modulator loading means, optical modulator, serial timing delay means, and interconnections. These additions increase the size of n until the functional limit of the photonics is reached.

As an example, if femtosecond pulses, as are commonly produced in the laser art, are used as the photonic source (1) and optical modulators (4)–(7) having a 2-gHz (0.5 ns) response are utilized, the parallel digital information input (19) can be expanded to include one half-million parallel lines without the use of non-binary digits (semaphores). When non-binary digits are used during each digit time, the information throughput can be greatly multiplied. As a result, the present invention should be capable of transmitting 1000 terabits per second and beyond using presently available components, while interfacing inherently slow electronics to high-speed photonics.

The length of setup time (42) of optical modulators (4)–(7) (which depends upon the type of modulators used) and the pulse width of the input pulses such as pulse (40) will determine the maximum pulse repetition rate for the input and sync pulses as shown on time lines (30) and (35), which in turn will determine the number n; that is, the number of digit times such as (47) available between sync pulses.

To initiate modulator loading and the setup times as shown on time line (37), input pulses from the series of pulses of photonic energy input at multiplexer input (2) as shown by time line (30) are also directed through delay means (18) as shown on time line (36) and into n modulator loading means (8) through the no one here designated (11). When electronic components are used, these load triggering pulses are directed into a photo diode which starts an electronic modulator loading circuit as discussed in the summary.

Each pulse exiting load delay means (18) triggers loading of the n modulators with new information from parallel digital information input (19), starting the modulator setup time, as for example (42) as shown on time line (37). Pulse setup times as shown on time line (37) may actually be timed events within the n modulator loading means (8)–(11) rather than an actual detectable signal having the wave form like that of modulator setup time (42) on time line (37). For this reason, the present invention is as compatible with optoelectronic modulators and electronic modulator loading means as with photonic, mechanical, acoustic and other modulating and modulator loading means. As a result, the present invention can provide photonic serial information at a speed which is considerably faster than that of conventional single electronic modulator methods. This advantage is provided by the use of modulator loading times which occur during the transmission of the previously loaded and sampled data set.

The present invention transmits asynchronously, with each sync pulse acting as a start pulse for the data set which follows.

Input pulses (38), (40), and (45), shown on time line (30), are directed into the n optical modulators (4)–(7) to read them. This read time can be at any time that is not simultaneous with a setup time such as (42) shown on time line (37). For example, they can be read during time (43), which is between setup times on time line (37).

Of particular interest is the relationship between the setup times and the first sync pulse in the embodiment shown. The first input pulse (38) reads the modulation state of optical modulators (4)–(7). At that time, the modulators may contain unknown data or may be off or preset since no setup time has yet occurred. This is because modulator read pulses occur before the setup time begins for loading the next data set. Thus, the first data set (41) may be null or may contain unknown or preset data. A null or preset modulation pattern can be used by certain demultiplexers for determining the source of the information which follows, for calibration, or to provide other system information to the demultiplexer.

The first parallel digital data set is loaded following pulse (38), which is delayed by load delay means (18), which in turn triggers the start of setup time (42). This occurs during the time that the first (possibly null) data set (41) is being transmitted.

The optical modulators are set up and stable at the completion of setup time (42) so that they can be read by the second input pulse (45).

The modulator outputs are delayed, each one by an amount which differs by at least one digit time (such as (46) and (47)), to their individual digit time slots as in time lines (31)–(34) and are combined into output (17) as a complete data set (44), shown in time line (35). The process then continues in the same cyclic manner for the following trigger, setup, read, delay and transmit sequences.

The first data set (41) can be eliminated by changing the timing delays of the various delay means used throughout the invention. In particular, sync delay means (3) can be used to delay the sync pulses so that the first pulse arrives one data frame later; that is, the first sync pulse (38') would then arrive at (45').

Certain types of delay, modulation, loading means, beam combining, and output means require the use of amplifiers and pulse shapers that can be inserted as needed within the present invention.

It should be noted that other embodiments of the present invention place delay means before the optical modulators and/or sync output while providing other delays before or within the modulator loading means. However, the disclosed embodiment is simple and compatible with electronic parallel digital information input means.

Figure 3:
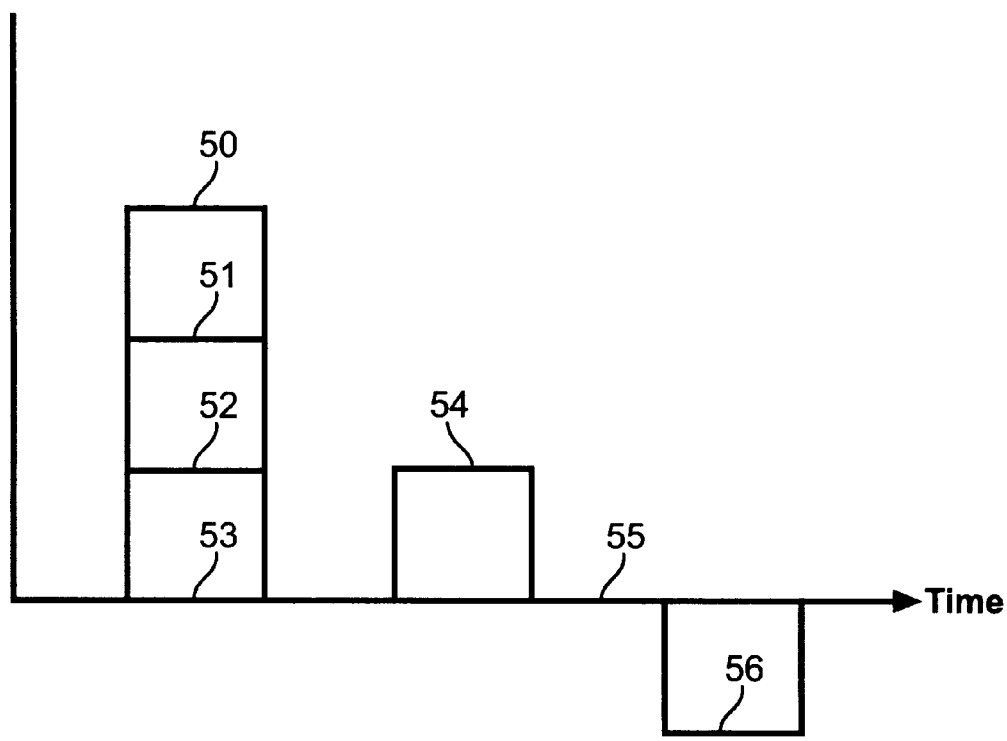
FIG. 3 is a pulse diagram showing multistate digit time pulses.

FIG. 3 shows a non-binary semaphore quadnary digit having four different amplitude modulated levels (50) through (53), one level of which is transmitted during a digit time (such as (47) of FIG. 2) to indicate one of four digits. The parallel digital information input (19) can be multilevel, or binary to multi-level encoding can be accomplished within the modulator loading means (8)–(11).

There are many combinations of non-binary transmission methods that can be used with the n optical modulators. Another example is as shown by waveforms (54), (55), and (56) of FIG. 3, which is ternary. These waveforms indicate the use of a combination of phase and amplitude modulation.

The photonic carrier wave represented by (54) is 180 degrees out of phase with (56) (as indicated by its position below the zero axis line). On the other hand, (55) is amplitude-modulated low; this modulation combination is particularly useful when interference-based photonic components such as those taught in U.S. Pat. No. 5,093,802 are being used at the receiving demultiplexer.

If each of the optical modulators is loaded with non-binary modulation state combinations, considerably more information can be transmitted during each digit time than if binary modulation is used. Any combination of stable modulation states using any combination of modulation methods can be used. The present invention is ideally suited for such modulation techniques because the method provides ample time for loading the modulators, even modulators which are quite slow. Multiple modulators can be used for each digit time slot so that the engineer can mix and match phase, amplitude, polarization, and spacial modulation techniques as the transmitting medium and demultiplexers require. Also, the types of delay means available are compatible with a variety of modulation methods.

The present invention can be used to provide serial photonic information for a variety of tasks. It can be used for fiber optic transmission, satellite and terrestrial microwave links, and for writing to optical devices such as CD ROMs, holographic storage devices, and fiber optic circulating data storage devices.

The photonic components usable in the present invention include those having the capability of frequency multiplexing (or wave division multiplexing) so that multiple frequency channels can be used simultaneously during each digit time. This feature is important when transmission or information storage mediums such as optical fibers or microwave links are combined with repeater amplifiers having a limited number of frequency channels available. The present invention can be used with various combinations of frequency channels, pulse repetition rates, and modulation methods to suit the medium it must drive.

To accomplish combination wave division and time division multiplexing, separate carrier wavelengths are routed from photonic source (1) to separate modulators. For example, red light would be routed to modulators (4) and (5) and green light to modulators (6) and (7).

While the foregoing description of the preferred embodiment of the present invention has disclosed specific constructions, means, and methods of accomplishing the present invention, because specific improvements and modifications will become readily apparent to those skilled in the art of computers and optical devices and the like, it is applicant's intent not to be limited by any of the foregoing descriptions, but only by the claims which follow.

What is claimed is:

1. A method of parallel digital to photonic serial conversion using delay means timing comprising the following steps:
   providing a first photonic pulse input having a first wavelength, at least first and second digital inputs which constitute a first parallel digital input, a multiplexer output, at least first and second photonic modulators, and at least first and second modulator loading means for loading first modulation states into said first and second photonic modulators using information from said first parallel digital input;
   routing said first digital input to said first modulator loading means and said second digital input to said second modulator loading means, and
   providing a routing system
      which routes said first modulation states from said first modulator loading means to said first modulator and from said second modulator loading means to said second modulator,
      which routes input pulses from said first photonic pulse input to said first and second modulator loading means to initiate modulator loading, to said multiplexer output to provide sync pulses, and to said first and second photonic modulators to read said first modulation states loaded into said first and second photonic modulators to provide first photonic digital pulses of said first wavelength, and
      which routes said first photonic digital pulses to said multiplexer output,
   said routing system including delay means as necessary to time the arrival of said first photonic digital output pulses at said multiplexer output in serial between said sync pulses.

2. The method of claim 1 wherein said delay means are arranged to provide said photonic digital pulses at said multiplexer output from a first data set from said first parallel digital input while said photonic modulators are being loaded with a second data set from said first parallel digital input.

3. The method of claim 1 including:
   providing a second photonic pulse input having a second wavelength, at least third and fourth digital inputs which constitute a second parallel digital input, at least third and fourth photonic modulators, and at least third and fourth modulator loading means for loading second modulation states into said third and fourth photonic modulators using information from said second parallel digital input;
   routing said third digital input to said third modulator loading means and said fourth digital input to said fourth modulator loading means, and
   providing a routing system
      which routes said second modulation states from said third modulator loading means to said third modulator and from said fourth modulator loading means to said fourth modulator,
      which routes input pulses from said second photonic pulse input to said third and fourth modulator loading means to initiate modulator loading, and to said third and fourth photonic modulators to read said second modulation states loaded into said third and fourth photonic modulators to provide second photonic digital pulses at said second wavelength, and
      which routes said second photonic digital pulses to said multiplexer output,
   said routing system including delay means as necessary to time the arrival of said second photonic digital output pulses at said multiplexer output in serial between said sync pulses,
   thereby providing a method of wave division multiplexed time division multiplexing.

4. The method of claim 1 wherein pulses at said multiplexer output are shorter than the response time of available optoelectronic devices used in multiplexers and/or demultiplexers.

5. The method of claim 1 wherein said first photonic digital output pulses are amplitude-modulated.

6. The method of claim 1 wherein said first photonic digital output pulses are phase-modulated.

7. The method of claim 1 wherein said first photonic digital output pulses are polarization-modulated.

8. The method of claim 1 wherein said first photonic digital output pulses are spacial modulated.

9. The method of claim 1 including using at least three-state information to control said first and second photonic modulators to produce pulses within said multiplexer output having multiple modulation states.

10. A time division multiplexer comprising:

a first photonic pulse input having a first wavelength, at least first and second digital inputs which constitute a first parallel digital input, a multiplexer output, at least first and second photonic modulators, and at least first and second modulator loading means for loading first modulation states into said first and second photonic modulators using information from said first parallel digital input;

a first routing system for routing said first digital input to said first modulator loading means and said second digital input to said second modulator loading means, and a second routing system for
routing said first modulation states from said first modulator loading means to said first photonic modulator and from said second modulator loading means to said second photonic modulator,
routing input pulses from said first photonic pulse input to said first and second modulator loading means to initiate modulator loading, to said multiplexer output to provide sync pulses, and to said first and second photonic modulators to read said first modulation states loaded into said first and second photonic modulators to provide first photonic digital pulses of said first wavelength, and
routing said first photonic digital pulses to said multiplexer output, said second routing system including delay means as necessary to time the arrival of said first photonic digital pulses at said multiplexer output in serial between said sync pulses, thereby providing a time division multiplexer by converting parallel information form said first parallel digital input into serial information at said multiplexer output.

11. The invention of claim 10 including:

a second photonic pulse input having a second wavelength, at least third and fourth digital inputs which constitute a second parallel digital input, at least third and fourth photonic modulators, and at least third and fourth modulator loading means for loading second modulation states into said third and fourth photonic modulators using information from said second parallel digital input;

a third routing system for routing said third digital input to said third modulator loading means and said fourth digital input to said fourth modulator loading means, and a fourth routing system for
routing said second modulation states from said third modulator loading means to said third modulator and from said fourth modulator loading means to said fourth photonic modulator,
routing input pulses from said second photonic pulse input to said third and fourth modulator loading means to initiate modulator loading, and to said third and fourth photonic modulators to read said second modulation states loaded into said third and fourth photonic modulators to provide second photonic digital pulses at said second wavelength, and
routing said second photonic digital pulses to said multiplexer output, said fourth routing system including delay means as necessary to time the arrival of said second photonic digital pulses at said multiplexer output in serial between said sync pulses, thereby providing a combination wave division and time division multiplexer.

* * * * *